Figure 1:
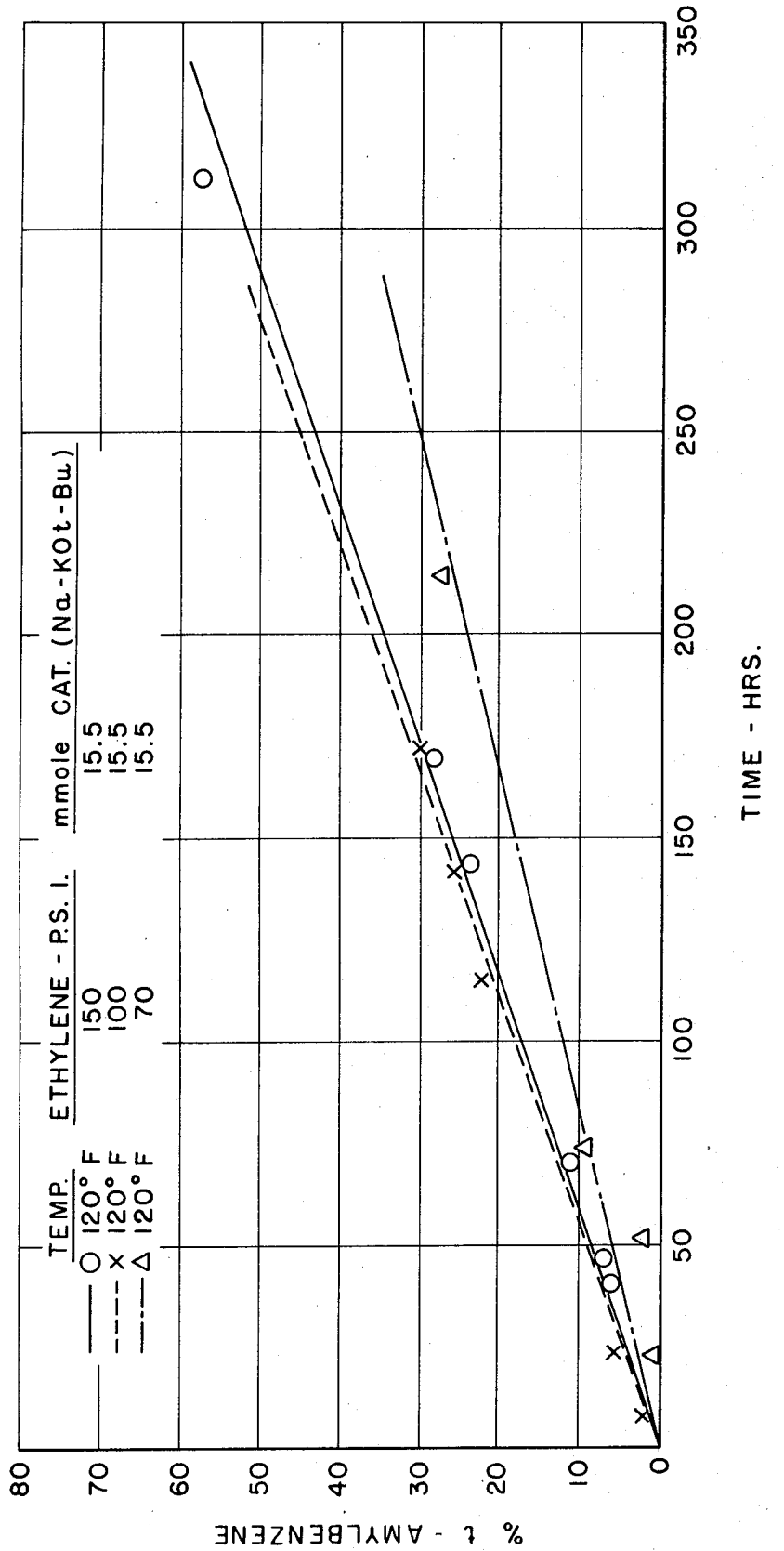

United States Patent
Cheng et al.

[15] 3,691,242
[45] Sept. 12, 1972

[54] METHOD OF PRODUCING T-ALKYLBENZENE

[72] Inventors: Tai Chun Cheng, 3663 Louise St., Mogadore, Ohio 44260; Adel F. Halasa, 5040 Everett Rd., P.O. Box 244, Bath, Ohio 44210

[22] Filed: March 25, 1971

[21] Appl. No.: 127,984

[52] U.S. Cl. ............................................260/668 B
[51] Int. Cl. ...............................................C07c 3/52
[58] Field of Search ...................................260/668 B

[56] References Cited

UNITED STATES PATENTS

| | | |
|---|---|---|
| 2,721,885 | 10/1955 | Pines et al. ..............260/668 B |
| 3,051,766 | 8/1962 | Hunter et al. ...........260/668 B |
| 3,082,267 | 3/1963 | Hunter et al. ...........260/668 B |
| 3,213,155 | 10/1965 | Schriesheim et al. ...260/668 B |

*Primary Examiner*—Curtis R. Davis
*Attorney*—S. M. Clark and Gordon B. Seward

[57] ABSTRACT t-Amylbenzene and 2,3-dimethyl-2-phenyl butane are made by reacting cumene with ethylene or propylene under mild reaction conditions. The reaction is catalyzed by using an alkali metal and an alkali metal alkoxide.

5 Claims, 3 Drawing Figures

FIG. I

METHOD OF PRODUCING T-ALKYLBENZENE

This invention relates to the production of t-alkyl benzenes which are precursors of substituted 1,3-dienes, and particularly t-amylbenzene and 2,3-dimethyl-2-phenyl which are precursors of isoprene and 2,3-dimethyl butadiene, respectively.

One known method of producing isoprene is by dehydrogenation of 2-methyl-1-butene. It is also known that 2,3-dimethyl butadiene can be similarly obtained by the dehydrogenation of 2,3-dimethyl-1-butene.

In the formation of these precursors of isoprene and 2,3-dimethyl butadiene, cumene has been reacted with an olefin—either ethylene or propylene—using an alkali metal as a reactant with a co-reactant at high pressures, over a wide range of temperatures. The alkali metals used are sodium, potassium and lithium.

British patent 1,173,126 and Pines et al. in 77 Jour. Am. Chem. Soc. 554–559 (1955) disclose the use of anthracene, fluorene, ortho-chlorotoluene, ortho-bromotoluene, ortho-toluic acid, para-toluic acid, benzonitrile, and organic peroxides as promoters of the reaction of ethylene and propylene with derivatives of benzene. None of these promoters yields a clean product, but a mixture of products from which the desired product must be separated.

In carrying out this invention a coreactant—not a promoter—is used with an alkali metal reactant (lithium, sodium or potassium) in the production of a t-alkylbenzene. Other alkali salts which may serve as coreactants are the oxides and peroxides of the alkali metals, particularly lithium, sodium and potassium. Also other benzene derivatives—both straight-chain and branched-chain—may be used instead of cumene.

The reactant and coreactant operate together as a catalyst. An advantage of the process is that it yields a product of high purity, substantially free of side products, while the prior art processes yield a mixture of products from which the desired product or products must be separated. The reactant and co-reactant may be used in the ratios of 1 mole of reactant to 0.5 to 2 moles of coreactant.

Figure 2:
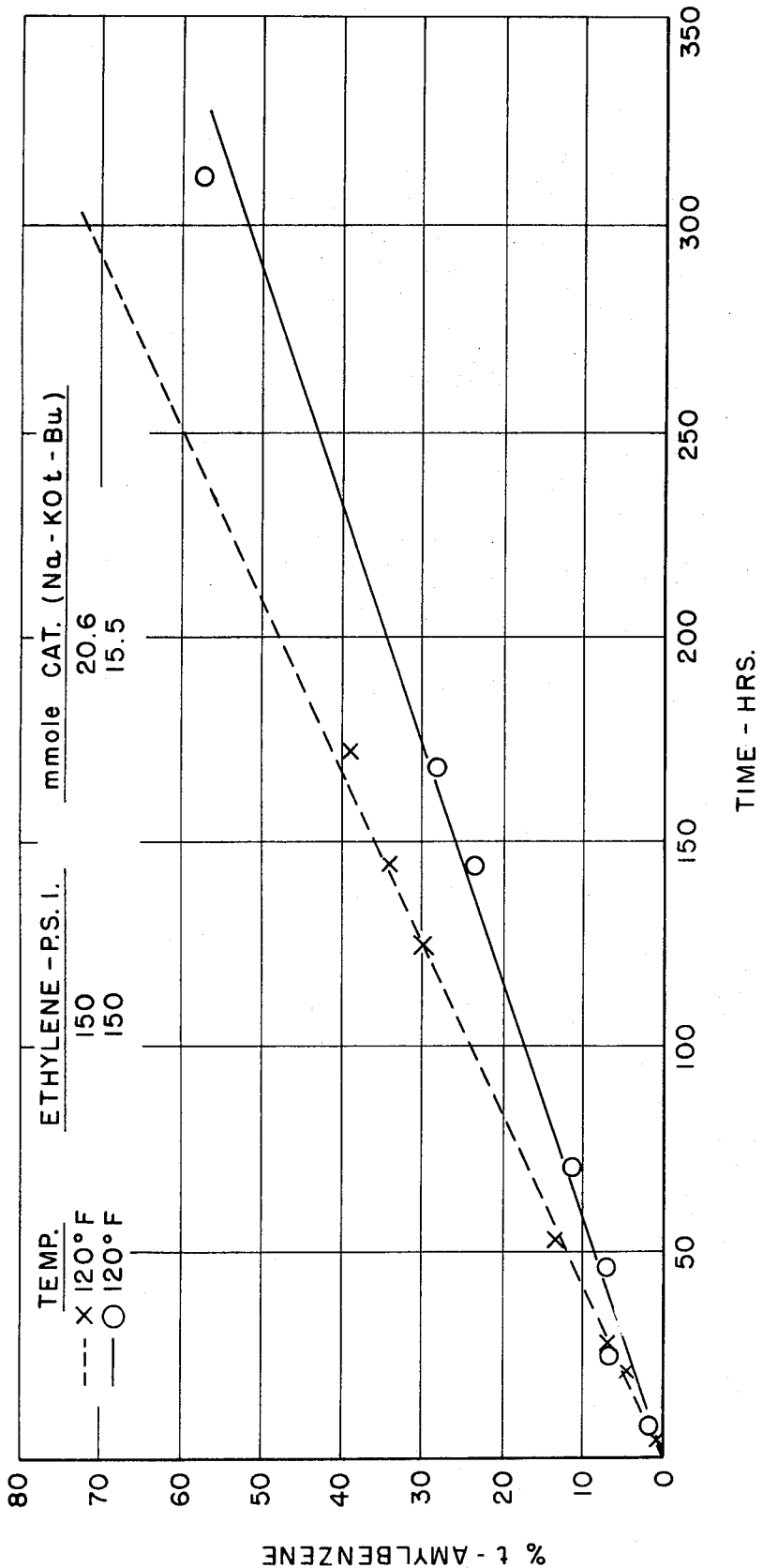
Figure 3:
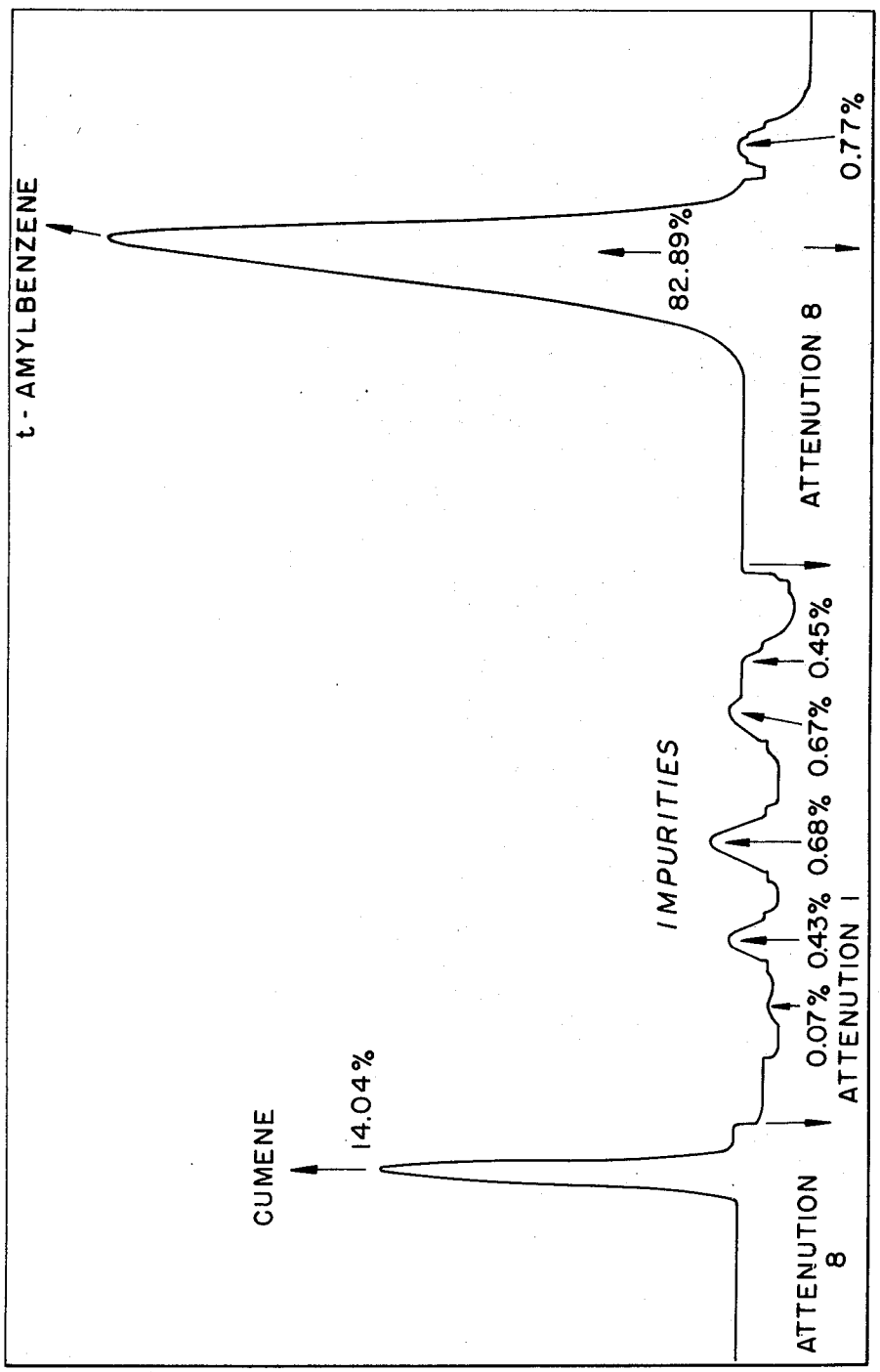

The invention is further discussed in connection with the accompanying graphs in which:

FIG. 1 and 2 illustrate the difference in the amount of product secured under different conditions; and FIG. 3 is a liquid chromatogram of crude products obtained from a reaction product described below.

The preferred alkali metal is sodium, and the preferred coreactant is potassium t-butoxide. The reaction conditions are relatively mild as compared with the reaction conditions of the prior art which yield a mixture of products. The pressure used may be as low as 50 pounds per square inch, but pressures up to 150 to 300 or even 500 pounds per square inch or more may be employed. At 50 pounds pressure, room temperature is adequate. However, higher temperatures up to, for example, 50° C. to 100° C. or even 200° C. or 300° C. or higher may be used at any of the pressures mentioned and at the high pressures mentioned temperatures of zero and below may be employed.

The amount of catalyst required is relatively small, but larger amounts will be used commercially to obtain higher rates of reaction. The excess catalyst can be recycled.

The following equations illustrate the invention:

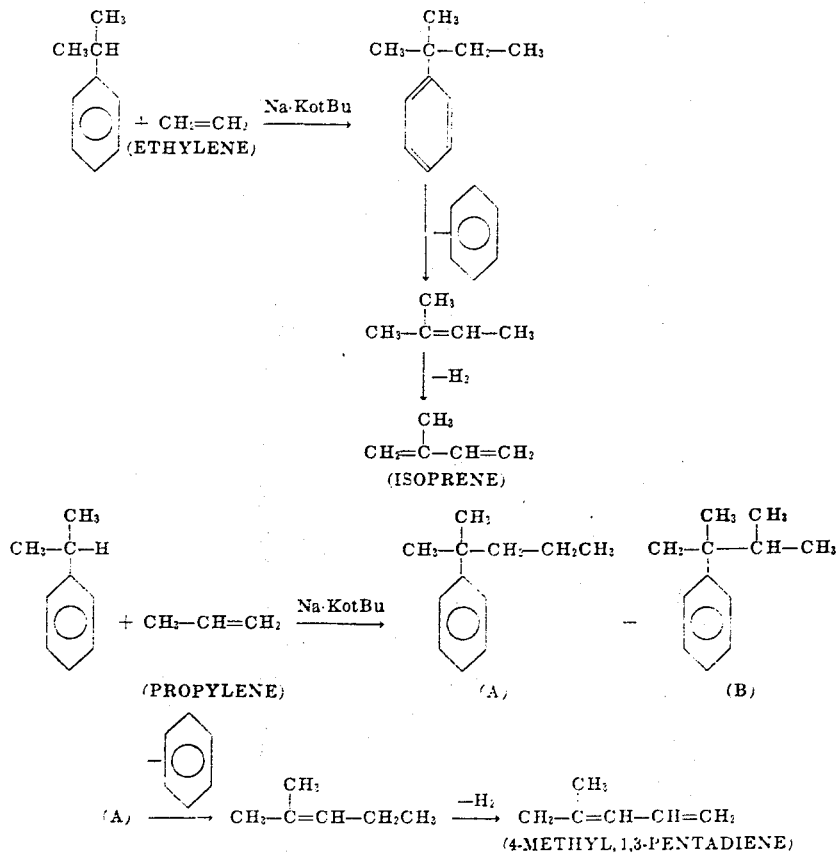

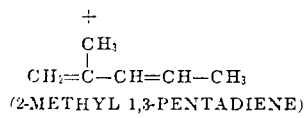
(2-METHYL 1,3-PENTADIENE)

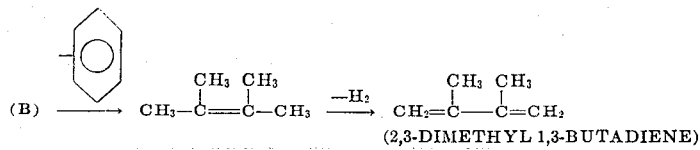
(2,3-DIMETHYL 1,3-BUTADIENE)

Any excess of metallic sodium and potassium t-butoxide and cumene may be recycled. The cumene may be added to the reaction vessel continuously or in increments, keeping the reaction mixture under desired ethylene or propylene pressure. As an example, the cumene and alkylbenzene used, with solvent if used, may be continuously distilled from the reaction vessel. The cumene and solvent will have a lower boiling point than the alkylbenzene which is therefore easily recovered and the cumene and solvent may be returned to the reaction vessel.

In commercial production substantially equal molar amounts of cumene and olefin will usually be employed, but any excess of either may be used and recovered. Usually 0.5 to 2.0 moles of olefin will be used for each mole of cumene.

Preferably, the amounts of alkali metal and coreactant used are the same. However, different amounts of each within the range of 0.5 to 0.001 mole for each mole of cumene may be used. With the smaller amounts of alkali metal and coreactant, the time required for carrying out the reaction may be increased to commercially impractical limits.

Usually, the starting material is a mono-alkylated benzene. However, a dialkylated benzene may be used. For instance, diisopropyl may be used to produce two moles of propylene.

The following examples illustrate the invention

EXAMPLE 1

PREPARATION OF t-AMYLBENZENE

Twelve grams of cumene, 300 ml. of purified hexane, and 30 milliequivalents of sodium and 30 millimoles of potassium t-butoxide were placed in a capped bottle. The sodium and potassium t-butoxide were pre-mixed at −70° C. in hexane solution to maintain the sodium in colloidal suspension, and the mixture was gradually warmed to room temperature before being added to the reaction mixture. The sodium is referred to as the reactant and the potassium t-butoxide is the coreactant. Together, they constitute the catalyst. The bottle was allowed to stand in a 50° C. bath over night. At this time, 9 grams of ethylene was added and the reaction mixture was then placed in a 50° C. bath overnight, during which hydrolysis occurred. The reaction mixture was extracted with 200 ml. of ether three times. The combined organic layer was then dried with MgSo$_4$ overnight. The solvent was removed by means of simple distillation. Only t-amyl-benzene was isolated.

Yield: 5.8 grams = 65 percent yield.

B.p. 188°–191° C.

This was identified as t-amylbenzene by infrared, N.M.R. and mass spectrometry.

In the following tables, the catalyst used was 1 mole of sodium per 1 mole of potassium t-butoxide, except that no potassium t-butoxide was used in Run No. 1.

The following table illustrates the results obtained using ethylene in hexane solution at about 60 p.s.i.

TABLE I

Reaction of Ethylene and Cumene in Hexane

| Run No. | Conditions °C. | Days | Catalyst Type | MMole | Mole Ethylene | Mole Cumene | % Yield |
|---|---|---|---|---|---|---|---|
| 1 | 50 | 2 | Na | 100 | 0.33 | 0.1 | 0 |
| 2 | 50 | 1 | Na.KotBu | 30.8 | 0.47 | 0.1 | 65 |
| 3 | 50 | 6 | Na.KotBu | 30.8 | 0.35 | 0.1 | 81 |
| 4 | 50 | 6 | Na.KotBu | 3.1 | 0.33 | 0.3 | 15.5 |
| 5 | 50 | 6 | Na.KotBu | 3.1 | 0.33 | 0.3 | 26 |

Table I illustrates examples carried out at 50° C. in hexane with various amounts of sodium potassium butoxide as catalyst, except Run No. 1 which was the control.

The yield in Runs No. 4 and 5 was low due to the amount of catalyst used.

Under similar conditions, a catalyst of butyllithium and potassium t-butoxide gave only a low yield of reaction products. Lithium butoxide with sodium also gave a relatively low yield.

An example similar to Run No. 3 but using propylene instead of ethylene gave a yield of about 10 percent of 2,3-dimethyl2-phenyl butane which by a similar procedure yields 2,3-dimethylbutadiene. The yield may be improved by changing the conditions, as by omitting the solvent and increasing the ratio of cumene to propylene, the cumene serving as a solvent as well as a reactant, and also increasing the temperature and catalyst level, as illustrated by the results recorded in the following table.

TABLE II

Reaction of Ethylene and Cumene with Na.KotBu Catalyst at 120° F. in Hexane

| Run No. | MMole Catalyst | Ethylene (psi) | Cumene | Reaction Condition | Time (Hr.) | % t-amyl-benzene |
|---|---|---|---|---|---|---|
| 1 | 15.5 | 70 | 1.5 | 120 | 200 | 19.0 |
| 2 | 15.5 | 100 | 1.5 | 120 | 200 | 36.0 |
| 3 | 15.5 | 150 | 1.5 | 120 | 200 | 35.0 |
| 4 | 20.6 | 150 | 1.5 | 120 | 200 | 49.0 |

Table II forms a basis for the graphs shown in FIG. 1. The catalyst was made up of equimolar parts of sodium and potassium t-butoxide; the temperature was 50° C. Run No. 3 is not included. The graph shows the increase in total yield of the t-amylbenzene with an increase in the time of the reaction.

FIG. 2 is based on Runs 3 and 4 of Table II, showing that the increase in the catalyst level increases the yield.

FIG. 3 illustrates the purity of the t-amylbenzene, based on Run No. 3 of Table I without purification. The figures were obtained by gas chromatography. The areas represent the amount of cumene, t-amylbenzene and various impurities in the reaction product, the attenution factor used in recording the impurities was one-eighth that used in recording the amounts of cumene and t-amylbenzene. It is worth while to note that only two peaks are present representing the unused cumene and the t-amylbenzene which is the desired reaction product.

All the chemicals used in this study were purified according to standard procedure. In FIGS. 1 and 2, heptane was used as the internal standard. The rates of this reaction were measured either by following the disappearance of cumene or the formation of t-amylbenzene. In every case, these values were close to each other, since the impurity formed in this reaction is less than 5 percent.

We claim:

1. The method of preparing a t-alkylbenzene which comprises reacting cumene with an olefin of the class consisting of ethylene and propylene using as catalyst both an alkali metal and as coreactant 0.5 to 2 moles of an alkali metal alkoxide containing one to 10 carbon atoms for each mole of alkali metal, the amount of catalyst being 0.5 to 0.001 mole for each mole of cumene, the temperature being 0° to 300° C., and the pressure being 50 to 500 pounds per square inch.

2. The process of claim 1 in which the olefin is ethylene.

3. The process of claim 1 in which the olefin is propylene.

4. The process of claim 1 in which the temperature is 50° to 100° C. and the pressure is 50 to 150 pounds per square inch.

5. The process of claim 4 in which the catalyst is sodium and the promoter is potassium t-butoxide.

* * * * *

UNITED STATES PATENT OFFICE
CERTIFICATE OF CORRECTION

Patent No. 3,691,242  Dated September 12, 1972

Inventor(s) Tai Chun Cheng and Adel F. Halasa

It is certified that error appears in the above-identified patent and that said Letters Patent are hereby corrected as shown below:

Col. 2, line 12, "Fig. 1 and 2" should read --Figs. 1 and 2--

Col. 4, line 41, "2,3-dimethyl2-phenyl" should read

--2,3-dimethyl-2-phenyl--

On the title page, after "[72] Inventors:"

the following should be inserted:

[73] Assignee: The Firestone Tire & Rubber Company
Akron, Ohio

Signed and sealed this 10th day of April 1973.

(SEAL)
Attest:

EDWARD M. FLETCHER, JR.
Attesting Officer

ROBERT GOTTSCHALK
Commissioner of Patents